(12) United States Patent
Kestering

(10) Patent No.: US 10,641,127 B2
(45) Date of Patent: May 5, 2020

(54) DEVICE AND METHOD FOR MEASURING A ROTATIONAL MOVEMENT, IN PARTICULAR A ROTATIONAL DIRECTION, AND FOR DETECTING A SHAFT BREAK

(71) Applicant: Rolls-Royce Deutschland Ltd & Co KG, Blankenfelde-Mahlow (DE)

(72) Inventor: Jens Kestering, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 190 days.

(21) Appl. No.: 15/697,051

(22) Filed: Sep. 6, 2017

(65) Prior Publication Data
US 2018/0073387 A1 Mar. 15, 2018

(30) Foreign Application Priority Data

Sep. 15, 2016 (DE) .................... 10 2016 217 690

(51) Int. Cl.
*F01D 21/00* (2006.01)
*G01P 13/04* (2006.01)
(Continued)

(52) U.S. Cl.
CPC ............. *F01D 21/003* (2013.01); *G01L 3/08* (2013.01); *G01M 15/14* (2013.01); *G01P 3/26* (2013.01);
(Continued)

(58) Field of Classification Search
CPC ........ F01D 21/003; G01L 3/08; G01P 13/045; G01P 3/486; G01P 3/36; G01P 3/26; G01M 15/14
See application file for complete search history.

(56) References Cited

U.S. PATENT DOCUMENTS 4,075,562 A 2/1978 Karstensen et al.
4,506,339 A 3/1985 Kuehnlein
(Continued)

FOREIGN PATENT DOCUMENTS

CN 102393268 A 3/2012
DE 2254253 A1 5/1973
(Continued)

OTHER PUBLICATIONS

European Search Report dated Apr. 25, 2018 for counterpart European Patent Application No. 17187699.8.
(Continued)

*Primary Examiner* — Freddie Kirkland, III
(74) *Attorney, Agent, or Firm* — Shuttleworth & Ingersoll, PLC; Timothy J. Klima

(57) ABSTRACT

A turbomachine with at least one rotatable shaft and at least one device for measuring a rotational movement of a rotatable structural component), in particular of the shaft, is provided. The device has a receiver and a first pattern carrier that has at least one pattern site. Here, the device comprises a second pattern carrier with at least one pattern site, wherein the pattern carriers are respectively connectable or connected to the rotatable structural component, so that they are rotatable together with the same about a rotational axis with respect to the receiver, namely in such a manner that the pattern site of the first pattern carrier is positioned in congruence with the pattern site of the second pattern carrier, and wherein the receiver is embodied and configured for detecting whether or not the pattern sites are positioned in congruence with one another.

18 Claims, 8 Drawing Sheets

(51) Int. Cl.
 *G01P 3/486* (2006.01)
 *G01L 3/08* (2006.01)
 *G01M 15/14* (2006.01)
 *G01P 3/26* (2006.01)
 *G01P 3/36* (2006.01)

(52) U.S. Cl.
 CPC .............. *G01P 3/36* (2013.01); *G01P 3/486* (2013.01); *G01P 13/045* (2013.01)

(56) References Cited

U.S. PATENT DOCUMENTS

| | | | |
|---|---|---|---|
| 4,658,133 A | | 4/1987 | Masaharu |
| 4,827,123 A | | 5/1989 | Gray |
| 4,836,689 A | | 6/1989 | OBrien et al. |
| 4,933,673 A | | 6/1990 | Ishizuka et al. |
| 5,004,981 A | | 4/1991 | Hashimoto et al. |
| 5,070,726 A | | 12/1991 | Fukui et al. |
| 5,253,531 A | * | 10/1993 | Walker .................. G01H 1/003 250/237 G |
| 5,369,583 A | * | 11/1994 | Hazelden .................. G01L 3/12 701/48 |
| 5,438,882 A | * | 8/1995 | Karim-Panahi .......... G01H 1/10 73/650 |
| 5,501,105 A | * | 3/1996 | Hernandez ............. G01H 1/003 324/226 |
| 5,969,269 A | | 10/1999 | Munyon et al. |
| 6,622,109 B2 | | 9/2003 | Ermer et al. |
| 6,629,625 B1 | | 10/2003 | Paczkowski et al. |
| 6,944,908 B2 | | 9/2005 | Hoetzer et al. |
| 7,104,133 B2 | * | 9/2006 | Kuroda .................... G01H 9/00 356/455 |
| 7,559,258 B2 | * | 7/2009 | Matzoll .................... G01L 3/12 73/862.08 |
| 7,784,364 B2 | * | 8/2010 | Matzoll .................... G01L 3/12 73/800 |
| 8,042,412 B2 | * | 10/2011 | Xia ........................ G01H 9/004 73/650 |
| 8,910,531 B1 | * | 12/2014 | Sue ....................... G01M 15/14 73/862.041 |
| 9,176,024 B2 | * | 11/2015 | Jensen .................... F01D 17/02 |
| 9,708,926 B2 | * | 7/2017 | Curlier .................... F01D 21/003 |
| 2009/0193894 A1 | | 8/2009 | Kabatzke |
| 2013/0098042 A1 | | 4/2013 | Frealle et al. |
| 2015/0222856 A1 | | 8/2015 | Hasegawa et al. |
| 2015/0233736 A1 | | 8/2015 | Habenschaden |
| 2016/0076394 A1 | | 3/2016 | Maalouf et al. |
| 2018/0073387 A1 | | 3/2018 | Kestering |
| 2018/0074089 A1 | * | 3/2018 | Kestering ............... F03D 17/00 |

FOREIGN PATENT DOCUMENTS

| | | |
|---|---|---|
| DE | 3145162 A1 | 5/1983 |
| DE | 3938057 A1 | 5/1990 |
| DE | 4031129 A1 | 4/1991 |
| DE | 3809804 C2 | 7/1991 |
| DE | 4014431 C1 | 7/1991 |
| DE | 19510604 A1 | 2/1996 |
| DE | 69423006 | 9/2000 |
| DE | 19932965 A1 | 1/2001 |
| DE | 10012004 A1 | 9/2001 |
| DE | 10012202 A1 | 9/2001 |
| DE | 10217887 A1 | 11/2003 |
| DE | 102007023480 A1 | 11/2008 |
| DE | 102007055239 A1 | 5/2009 |
| DE | 102008007519 A1 | 8/2009 |
| DE | 102009031855 A1 | 1/2011 |
| DE | 102013226516 A1 | 7/2015 |
| GB | 1129583 A | 10/1968 |
| GB | 1416679 A | 12/1975 |
| GB | 2151775 A | 7/1985 |
| JP | S56110018 A | 9/1981 |

OTHER PUBLICATIONS

Hazelden, R. J.; Application of an Optical Torque Sensor to a Vehicle Power Steering System; IEE Colloquium on Automotive Sensors, 1992; p. 9/1-9/3.
German Search Report dated Mar. 3, 2017 for counterpart German Application No. DE 10 2016 217 690.0.
European Search Report dated Apr. 25, 2018 from related European Patent Application No. 17187693.1.
German Search Report dated Mar. 3, 2017 for related German Patent Application No. DE 10 2016 217 687.0.
European Search Report dated Jan. 11, 2018 for related European Patent Application No. 17187693.1.
European Search Report dated Jan. 23, 2018 from counterpart European App No. 17187699.8.
European Office Action dated Aug. 21, 2019 from related European Patent Application No. 17187693.1.
European Office Action dated Aug. 22, 2019 from relaed European Patent Application No. 17187699.8.
Kiselev et al., "Photoelectric Methodof Measuring the Rotation Period of a Turbine Drive Shaft", Measurement Techniques, vol. 39, No. 12, 1996.

* cited by examiner

DEVICE AND METHOD FOR MEASURING A ROTATIONAL MOVEMENT, IN PARTICULAR A ROTATIONAL DIRECTION, AND FOR DETECTING A SHAFT BREAK

REFERENCE TO RELATED APPLICATION

This application claims priority to German Patent Application No. 10 2016 217 690.0 filed on Sep. 15, 2016, the entirety of which is incorporated by reference herein.

BACKGROUND

The invention relates to a turbomachine and a method for measuring a rotational movement of a rotatable structural component of a turbomachine.

Such a turbomachine comprises at least one rotatable structural component, in particular in the form of a rotatable shaft, and at least one device for measuring a rotational movement of the rotatable structural component, in particular the shaft. The device comprises a receiver and a pattern carrier acting together with the receiver. The pattern carrier comprises at least one pattern site.

The rotational movements of the rotatable structural component that are measured with such devices can for example be used for controlling and monitoring the rotatable structural component. A rotatable structural component can for example be a shaft and/or an axle, in particular a shaft of the turbomachine, for example the turbomachine that is embodied as an aircraft gas turbine.

The measurement of a rotational movement comprises the measurement of a rotational speed and/or the measurement of a rotational direction.

What is known from practice are for example inductive devices for measuring rotational speeds, which are also referred to as a pulse wheel or "phonic wheel".

DE 10 2007 055 239 A1 describes a device for measuring the rotational speed of a hollow shaft of a jet engine mounted inside a turbine housing. In this device, magnetic flows serve as information carriers. A pattern carrier in the form of a gearing with multiple teeth as pattern sites is arranged at the hollow shaft. A sensor arranged adjacent to the gearing serves as a receiver. The gearing can be rotated with respect to the sensor about the rotational axis of the shaft together with the shaft, with the sensor detecting different magnetic flows, if a tooth or a gap of the gearing is facing towards the sensor.

In some applications, in particular in turbomachines, it is desirable to also measure a rotational direction of the rotatable structural component, in particular of the shaft, in addition to the rotational speed. If for example a turbomachine that is not in operation, for example an aircraft gas turbine, is impinged by wind, one or multiple shafts of the turbomachine can be set into rotation. Such a situation is also referred to as "wind milling".

In the event of wind impinging from the rear, it is possible that one or multiple shafts of the turbomachine are set into a rotation counter to the rotation as intended during operation. Starting the turbomachine with a fuel supply during this reversed rotation can lead to overheating and damage to the turbomachine. Thus, in the event of strong wind, it is possible that a value corresponding to the minimum number of revolutions of the turbomachine is reached by "wind milling". If the intended rotational direction of the turbomachine is not observed by a user of the turbomachine during the start, for example because no rotational direction display is provided, in particular damage to the compressor of the turbomachine due to overheating may occur.

Further, depending on the application site of the device, the known inductive measurements can be compromised by external electromagnetic influences.

Further, in some applications, in particular in turbomachines, there is the danger that the rotatable structural component is rotated with an excessively high rotational speed. Such a rotation is also referred to as overspeed. As a result of overspeed, the rotatable structural component or adjacent structural components can be damaged. If an overspeed is detected in time, suitable countermeasures can be taken to avoid any damage from occurring.

Overspeed can occur in a shaft of a turbomachine, which connects a compressor to a turbine, as a consequence of a shaft break. For, in the event of a shaft break, the braking compressor can no longer be driven by the turbine according to the intended use. Thus, the turbine can for example be further accelerated by residual energy in the combustion gases of the turbomachine. Therefore, it is desirable to disconnect the fuel supply as quickly as possible, so that the shaft can no longer be accelerated before the number of revolutions of the shaft exceeds a critical number of revolutions, which depends on the strength of the material, and at which further parts may be destroyed.

If the rotatable structural component has already been damaged as a result of overspeed, it is desirable to detect this fact as soon as possible in order to minimize possible consequential damage.

SUMMARY

There is the objective to provide an improved turbomachine with a device, in particular with a device that can detect a break of the rotatable structural component (of the shaft).

The objective is achieved through a turbomachine with features as described herein.

The turbomachine comprises at least one second pattern carrier that has at least one pattern site. Here, both pattern carriers are respectively connectable or connected to the rotatable structural component, in particular to the shaft of the turbomachine, so that they can be rotated together with the same about a rotational axis with respect to the receiver in such a manner that the at least one pattern site of the first pattern carrier is arranged in congruence with the at least one pattern site of the second pattern carrier. The receiver is embodied and configured for detecting whether the pattern site of the first pattern carrier is arranged in congruence or out of congruence with the pattern site of the second pattern carrier. For example, the receiver is embodied to provide a signal to an analysis unit if the pattern sites are positioned in congruence and/or, as appropriate, to provide a differing signal if the pattern sites are arranged out of congruence.

The pattern site of the first pattern carrier and the pattern site of the second pattern carrier can substantially have the same shape and/or size. For example, a congruence of the pattern site of the first pattern carrier and the pattern site of the second pattern carrier is present in the case that the pattern sites overlap or overlay at least partially, at least mostly or completely. For example, the pattern sites are arranged adjacent to one another.

The receiver detects the congruent pattern sites of the pattern carriers that are rotatable with respect to the receiver, for example once or twice per revolution. Based on this, the receiver or an analysis unit connected to the receiver can determine the rotational speed and in particular a break of the rotatable structural component (of the shaft) in a simple manner.

By rotating the pattern carrier about the rotational axis, at least one pattern site can be turned towards and turned away from the receiver in particular in a periodic manner. The receiver is embodied and configured to detect a pattern site that is facing towards it, i.e. to detect whether a pattern site is turned towards it or not.

According to one embodiment variant, it is provided that one of the pattern carriers is connectable or connected to the rotatable structural component (the shaft) at a drive end of the rotatable structural component (the shaft). The drive end of the rotatable structural component (the shaft) is that side or that section of the rotatable structural component (the shaft) at which the rotatable structural component (the shaft) is driven (for the purpose of rotation, in particular with respect to the receiver). For example, if the rotatable structural component is a shaft of a turbomachine, the drive end of the shaft is that longitudinal side of the shaft that supports the turbine or a turbine stage of the turbomachine. The other one of the pattern carriers can be connectable or connected to the rotatable structural component (the shaft) at an output end of the rotatable structural component (the shaft). The output end of the rotatable structural component (the shaft) is for example that side or that section of the rotatable structural component (the shaft) at which the rotatable structural component (the shaft) drives a further structural component (for the purpose of rotation). For example, if the rotatable structural component is a shaft of a turbomachine, the output end of the shaft is that longitudinal side of the shaft that supports, in particular drives, a compressor or a compressor stage of the turbomachine. The drive end and the output end of the rotatable structural component (the shaft) are for example arranged along the rotational direction next to one another and/or at a distance from one another.

For example, the pattern carriers are connectable or connected to the rotatable structural component (the shaft) in such a manner that the pattern sites are positioned in congruence with one another when the rotatable structural component (the shaft) is in a normal operational state, and are positioned out of congruence with one another when the rotatable structural component (the shaft) is in an overloaded operational state (which differs from the normal operation). The pattern carriers can be mounted in such a manner that no relative movement occurs between the pattern carriers in a normal operational state of the rotatable structural component (the shaft). An overloaded operational state can lead to a torsion of the rotatable structural component (the shaft) and/or even to it breaking. Through the drive-side or output-side connection of the two pattern carriers to the rotatable structural component (the shaft), a relative movement occurs between the pattern carriers, for example in rotational direction. Through a relative movement between the pattern carriers, the pattern sites of the pattern carriers are positioned of congruence with one another. The receiver detects that the pattern sites have been positioned out of congruence. The analysis unit can output a control signal by which the rotatable structural component (the shaft) is decelerated and/or stopped. For example, the analysis unit initiates a reduction or a stop of a fuel feed. In this manner, any damage to the rotatable structural component (the shaft) and further structural components and/or consequential damage can be minimized or avoided.

The first pattern carrier can be arranged inside the second pattern carrier. The second pattern carrier can for example be embodied in the form of a hollow shaft and/or can form a part of the rotatable structural component (the shaft). Optionally, the rotatable structural component (the shaft) forms a component of the device. The receiver is arranged outside of the second pattern carrier or inside the first pattern carrier, for example. Alternatively, the pattern carrier is embodied in the form of a punched disk, in particular in the form of a circular disk that is arranged coaxially to the rotational axis. If, for example, the rotatable structural component is a shaft of a turbomachine, the receivers are for example fixated at the statics of the turbomachine by which the shaft is rotatably mounted.

The pattern sites (if appropriate, all of them) can substantially extend in parallel or perpendicular to the rotational axis through the pattern carrier, in particular in such a manner that a straight line can be extended through them in parallel or perpendicular to the rotational axis. For example, the pattern sites are embodied respectively in the form of a hole in the respective pattern carrier. In particular, if the pattern sites are embodied as holes, the pattern carriers in the area of the pattern sites can be passable by the information carrier. For example, the pattern carriers are passable for the information carrier only in the area of the pattern sites. The holes can be respectively embodied with the same size or with a different size.

The pattern carriers can respectively have pairs of pattern sites (for example holes) that are arranged opposite one another on both sides of the rotational axis.

It can be provided that an information carrier that starts at the pattern sites and/or that passes the pattern sites can reach the receiver, (in particular only) if the pattern sites of the pattern carriers are arranged in congruence with one another on the path of the information carrier to the receiver.

The receiver can be embodied and configured for detecting an information carrier that exits from an (in particular facing) pattern site or interacts with the pattern site. The information carrier is for example embodied as (in particular electromagnetic) radiation, as mass flow and/or as sound, in particular as light rays (for example visible light rays, infrared light rays and/or ultraviolet light rays), as an air flow and/or as ultrasound. By registering the information carrier, the receiver detects that a (particularly facing) pattern site of the first pattern carrier is positioned in congruence with a pattern site of the second pattern carrier.

According to a further development, the receiver comprises at least one sensor or is in operative connection with at least one sensor. The sensor is embodied for detecting the information carrier. The sensor is in particular embodied in the form of an optical sensor (for example in the form of a photoconductive cell and/or a photo diode), of a mass flow meter, a pressure gauge and/or a microphone. It can be provided that each of the receivers of the device respectively comprises one sensor, for example an optical sensor. Alternatively or additionally, the receivers are in operative connection with a common sensor. A sensor can generate a signal that is for example provided to the analysis unit, which can process it.

The device can comprise at least one transmitting unit, which is embodied and configured for emitting the information carrier (in particular in the direction of the receiver). The transmitting unit for example comprises at least one light source (for example a light-emitting diode or a laser diode), air nozzle and/or acoustic source. The pattern carriers are for example arranged between the at least one transmitting unit and the receiver, in particular substantially perpendicular or parallel to the rotational axis. Alternatively or additionally, a transmitting unit is arranged at the pattern carrier, in particular at the pattern sites of the pattern carrier.

Further, at least one transmitting unit, for example a light source, is arranged alternatively or additionally at least at one receiver. For example, a mirror respectively serves as the pattern site.

According to one embodiment variant, both pattern carriers respectively have at least two pattern sites, wherein the pattern carriers can respectively be connectable or connected to the rotatable structural component (the shaft) in such a manner that they can be rotated together with the same about a rotational axis with respect to the receiver, wherein each pattern site of the first pattern carrier is positioned in congruence with a respectively associated pattern site of the second pattern carrier. At least two receivers can be provided. The receivers can be arranged at a distance from one another and/or in a solid mount with respect to one another. Each of the receivers is embodied and configured to detect whether a pattern site of the first pattern carrier is or is not arranged in congruence with a respectively associated pattern site of the second pattern carrier.

Among themselves, the multiple receivers and/or the multiple pattern sites (of each pattern carrier) can respectively be arranged along an angle extending about the circumference of the rotational axis and in a manner offset with respect to one another. Alternatively, the receivers as well as the pattern sites (of each pattern carrier) are respectively arranged among themselves along an angle extending about the circumference of the rotational axis and in a manner offset with respect to one another, wherein the pattern sites (of each pattern carrier) have an offset that differs from an offset of the receivers. The angle extending circumferentially about the rotational axis is also referred to as the azimuth angle or azimuth.

The use of multiple receivers and/or pattern sites facilitates particularly accurate measurements of the rotational speed of the rotatable structural component (the shaft). Further, the use of multiple receivers as well as of the different offsets of the receivers and pattern sites facilitates the measurement of a rotational direction of the rotatable structural component (the shaft). Also, the failure of one pattern site or one receiver does not directly lead to the failure of a function of the device.

The individual receivers and/or the individual pattern sites of each pattern carrier can be arranged so as to be offset in the (radial) direction perpendicular to the rotational axis and/or in the (axial) direction in parallel to the rotational axis (for example at a distance to one another). One or multiple receivers and/or one or multiple pattern sites can be arranged respectively substantially at the same radial distance to the rotational axis. In this manner, a particularly high measuring accuracy can be achieved.

The at least two pattern sites of each pattern carrier can be arranged according to a first pattern, and the at least two receivers can be arranged according to a second pattern. Here, the first pattern in particular differs from the second pattern. The patterns can respectively extend in a plane perpendicular to the rotational axis. The pattern sites are for example arranged in a plane that is offset with respect to the receivers along the rotational axis. The receivers can detect the pattern sites in the axial direction. Alternatively, the patterns respectively extend in a circumferential plane about the rotational axis, for example. The receivers are arranged radially outside the pattern sites, for example. The receivers can detect the pattern sites in the radial direction. For example, the pattern sites are arranged along a curved line as a first pattern, and the receivers are arranged along a straight line as a second pattern. Exactly three or more than three (in particular a multiple of three) pattern sites (per pattern carrier) and exactly three or more than three receivers can respectively be provided.

The device can comprise at least one anti-fogging device. For example, the anti-fogging device directs a fluid flow, in particular an air flow, on at least one of the receivers, in particular on all receivers and/or on at least one or all transmitting units. In this manner, any depositing, for example of liquid or solid floating particles, as a result of condensation from a surrounding gas on the receiver (and/or on the transmitting unit) can be avoided. In this manner, an undisturbed function of the device can be facilitated. In addition, the fluid/air flow can cool the receivers and/or transmitting units, whereby a flawless function and/or a maximally long service life can be ensured.

The turbomachine can in particular be embodied in the form of an aircraft gas turbine or a stationary turbine plant, and can comprise one or multiple shafts and one or multiple devices according to any desired embodiment described herein. What serves here as the rotatable structural component of the device is in particular the shaft of the turbomachine, which may for example be a low-pressure shaft, a medium-pressure shaft, and/or a high-pressure shaft of the turbomachine.

With the help of the device, the rotational speed and, where necessary, also the rotational direction of one or multiple shafts of the turbomachine can be measured in a reliable manner. By measuring the rotational direction of the shaft or the shafts of the turbomachine, a "wind milling" situation can be detected, and (if desired) a correction of the rotational direction can be performed before ignition in order to avoid any damage. Further, a shaft break can be reliably detected, so that for example a fuel supply can be interrupted before any consequential damage occurs.

At least one device can be arranged at the turbomachine in the rear end area of a shaft and/or in the area of a bearing site of the shaft. At the bearing site, the shaft can for example be rotatably mounted at the statics of the turbomachine. In the area of the bearing sites, a fixation of the pattern carrier of the device at the shaft and of the receivers at the statics of the turbomachine can be integrated particularly advantageously.

The objective is also achieved through a method for measuring a rotational movement of a rotatable structural component, in particular a shaft of a turbomachine, in particular a rotational speed and/or a rotational direction, and/or an operational state of the rotatable structural component (the shaft), with features as described herein.

What is used in the method is a receiver and a first pattern carrier, wherein the pattern carrier has at least one pattern site.

Here, a second pattern carrier is provided that has at least one pattern site, wherein the two pattern carriers are respectively connected to the rotatable structural component (the shaft), so that they can be rotated together with the same about a rotational axis with respect to the receiver in such a manner that the pattern site of the first pattern carrier is positioned in congruence with the pattern site of the second pattern carrier, and wherein the receiver detects whether or not the pattern sites are positioned in congruence with one another.

According to a further development of the method, it is provided that, based on information detected by the receiver, an overloaded operational state and/or a break of the rotatable structural component, which is in particular embodied as a shaft, is detected, and that a control signal is output to an engine control if an overloaded operational state and/or break is detected.

The information detected by the receiver can for example contain information about whether or not the pattern site of the first pattern carrier is positioned in congruence with the pattern site of the second pattern carrier. For example, if the pattern sites are not positioned in congruence, in particular over a predefined period of time, it is detected that an overloaded operational state and/or a break is present. The control signal can for example contain an instruction to reduce or turn off a fuel feed (in particular to a turbomachine which the shaft belongs to).

In this manner, it is possible to avoid a critical overspeed of the shaft, and to prevent any consequential damage, for example.

BRIEF DESCRIPTION OF THE DRAWINGS

The invention is explained in connection with the exemplary embodiments shown in the Figures.

DETAILED DESCRIPTION

Figure 1:
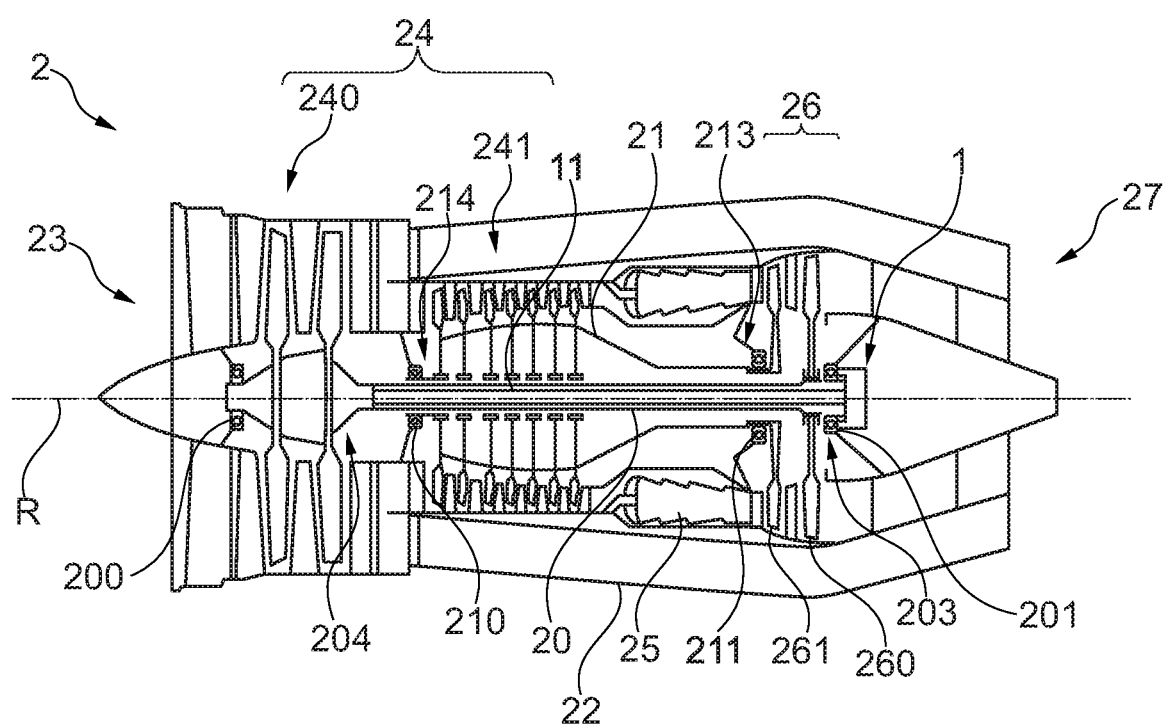
FIG. 1 shows a schematic rendering of an aircraft gas turbine as an embodiment of a turbomachine.

FIG. 1 shows a turbomachine in the embodiment of an aircraft gas turbine 2 for an aircraft. As rotatable structural components, the aircraft gas turbine 2 comprises multiple, in the present case two, shafts 20, 21 that are rotatable about a common rotational axis R. The shafts 20, 21 are arranged inside a housing 22 of the aircraft gas turbine 2. The housing 22 defines an air intake 23 of the aircraft gas turbine 2.

An air flow flows into the aircraft gas turbine 2 through the air intake 23. The aircraft gas turbine 2 has an axial through-flow direction. The through-flow direction extends substantially along the rotational axis R of the shafts 20, 21. Behind the air intake 23, the aircraft gas turbine 2 comprises, as viewed substantially in through-flow direction, a compressor 24, a combustion chamber 25, a turbine 26, and a nozzle 27.

In the present case, the aircraft gas turbine 2 is embodied with two shafts. One of the shafts 20, 21 serves as a low-pressure shaft 20, the other as a high-pressure shaft 21. Fixedly arranged at the low-pressure shaft 20 are a low-pressure compressor 240 of the compressor 24 as well as a low-pressure turbine 260 of the turbine 26. Fixedly arranged at the high-pressure shaft 21 are a high-pressure compressor 240 of the compressor 24 as well as a high-pressure turbine 260 of the turbine 26.

The aircraft gas turbine 2 works in a per se known manner. The low-pressure compressor 240 and the high-pressure compressor 241 compress the inflowing air flow, and conduct it into the combustion chamber 25 for combustion. The tension in the hot combustion gases that exit the combustion chamber 25 is reduced in the high-pressure turbine 261 and in the low-pressure turbine 260 before being discharged through the nozzle 27. The nozzle 27 ensures residual pressure release of the exiting hot combustion gases, as well as intermixing with secondary air. At that, the exiting air flow is accelerated, whereby thrust is created.

The low-pressure turbine 260 drives the low-pressure compressor 240 via the low-pressure shaft 20. The high-pressure turbine 261 drives the high-pressure compressor 241 via the high-pressure shaft 21.

Both shafts 20, 21 are mounted by means of suitable bearings 200, 201, 210, 211 so as to be rotatable about the rotational axis R with respect to an engine statics. The engine statics is fixedly connected to the housing 22. The engine statics can be fixedly connected to the aircraft.

According to FIG. 1, the low-pressure shaft 20 and the high-pressure shaft 21 have a front bearing 200, 210 at their respective ends that are facing towards the air intake 23. The front bearings 200, 210 are respectively embodied as ball bearings. At their ends that are respectively facing towards the air outlet 27, the low-pressure shaft 20 and the high-pressure shaft 21 comprise a rear bearing 201, 211. The rear bearings 201, 211 are respectively embodied as rolling bearings.

The high-pressure shaft 21 is embodied as a hollow shaft. The low-pressure shaft 20 is arranged inside the high-pressure shaft 21.

Both shafts 20, 21 respectively have a drive end 203, 213 and an output end 204, 214. The drive ends 203, 213 are driven by the respectively associated turbine stages 260, 261. The output ends 204, 214 are driven by the respective drive end 203, 213, and respectively drive a compressor stage 240, 241.

An excessively high force between one or both drive ends 203, 213 and one or both output ends 204, 214 can lead to excessive torsion and/or torsional vibrations of one or both shafts 20, 21, or may even lead to a break.

For determining a rotational movement of the low-pressure shaft 20, namely a rotational speed and a rotational direction, as well as an operational state, the aircraft gas turbine 2 comprises a device 1, which is rendered only in a schematic manner in FIG. 1. In the present case, the device 1 is arranged in the area of the rear bearing 201 of the low-pressure shaft 20.

For detecting a shaft break of the aircraft gas turbine 2, the device 1 comprises a first pattern carrier 11, which in the present case is arranged inside the low-pressure shaft 20 and is driven by the output end 204 of the low-pressure shaft 20 via a fixed connection.

The device 1 will be described in more detail based on the following Figures.

Figure 2A:
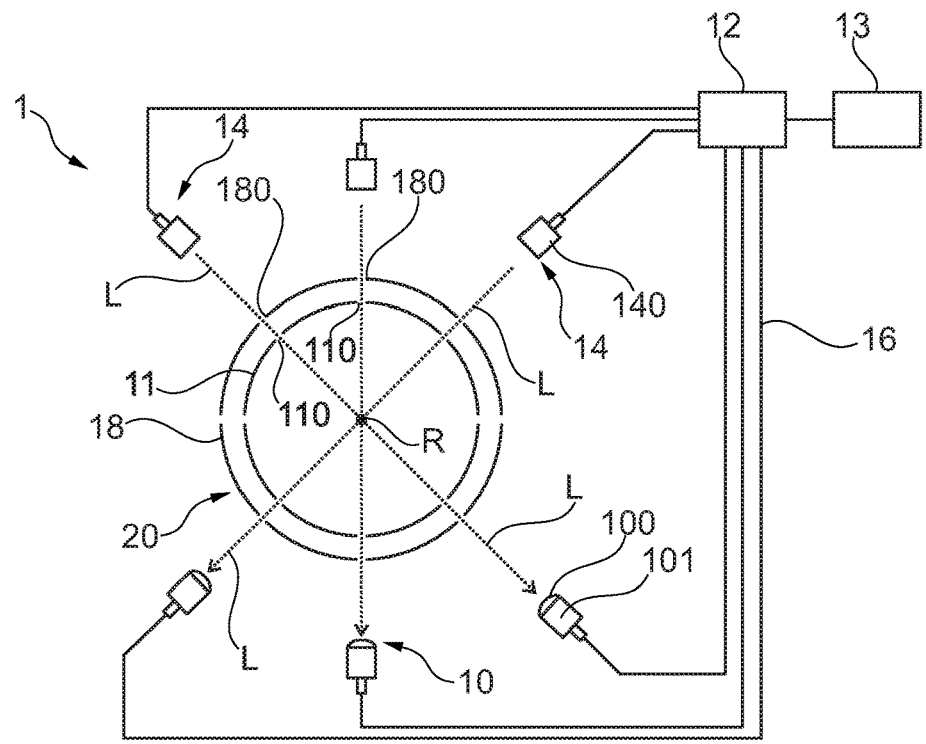
FIGS. 2A, 2B show, in a cross-sectional view perpendicular to the rotational axis, schematic renderings of a device for measuring a rotational movement of a structural component that is rotatable about a rotational axis.
Figure 2B:
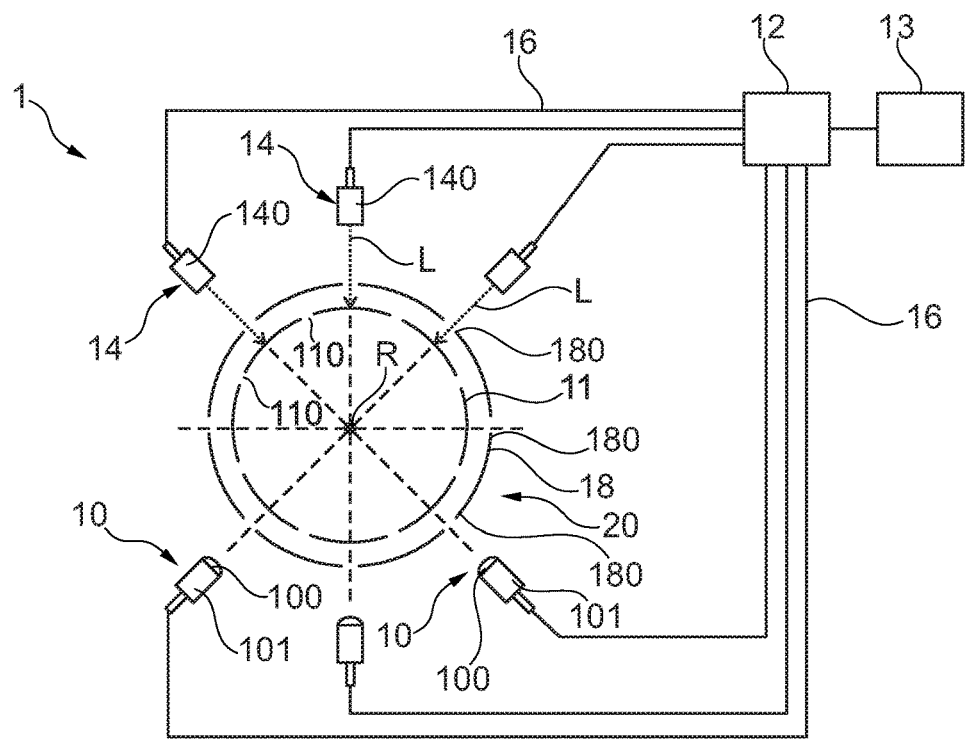

According to FIGS. 2A and 2B, a device 1 comprises the first pattern carrier 11, a second pattern carrier 18, multiple receivers 10, and multiple transmitting units 14. In the shown exemplary embodiment, the device 1 comprises exactly three receivers 10 and exactly three transmitting units 14.

The first pattern carrier 11 and the second pattern carrier 18 are arranged coaxially with respect to the rotational axis R.

The first pattern carrier is arranged inside the second pattern carrier 18. In the present case, the first pattern carrier 11 is embodied in the form of a hollow cylinder. The first pattern carrier 11 is connected to the low-pressure shaft 20 in a torque-proof manner. The first pattern carrier 11 is arranged in such a manner at the low-pressure shaft 20 that it can be rotated together with the low-pressure shaft 20 about the rotational axis R. For example, the first pattern carrier 11 is embodied in one piece with the low-pressure shaft 20 or is attached to the same in a suitable manner, for example by means of a screw connection.

The second pattern carrier 18 forms a shaft section of the low-pressure shaft 20. Thus, the second pattern carrier 18 forms a part of the rotatable structural component.

One of the pattern carriers 11, 18, namely in the present case the second pattern carrier 18, is formed at the low-pressure shaft 20 at the drive end 203 of the low-pressure shaft 20. The other one of the pattern carriers 11, 18, in the present case the first pattern carrier 11, is attached to the low-pressure shaft 20 at the output end 204 of the low-pressure shaft 20. Thus, the second pattern carrier 18 is offset from the drive end 203 during rotation about the rotational axis R, while the first pattern carrier 11 is offset from the output end 204 during rotation about the rotational axis R.

In the first as well as in the second pattern carrier 11, 18, multiple pattern sites are embodied in the form of holes 110, 180. More specifically, multiple pairs of pattern sites in the form of holes 110, 180, which are respectively arranged opposite one another with respect to the rotational axis R, are provided in both pattern carriers 11, 18.

In a normal operational state of the aircraft turbine 2, the shafts 20, 21 show no or only a tolerable degree of torsion. This state is shown in FIG. 2A.

In the normal operational state, the holes 110 of the first pattern carrier 11 are at least mostly, in particular completely, in congruence with respectively one adjacent hole 180 of the second pattern carrier 18. In the normal operational state of the aircraft turbine 2, both pattern carriers 11, 18 rotate together about the rotational axis R, wherein the holes 11, 180 (generally speaking, the pattern sites) remain in congruence with one another. An acceleration of the low-pressure shaft 20 can result in a deviation from an in particular complete congruence of the holes 110, 180, as it is for example present in a stationary state.

In an overloaded operational state, the shafts 20, 21 of the aircraft gas turbine 2 are twisted (or can even tear or break). This state is shown in FIG. 2B.

Due to the drive-side or output-side fixation of the two pattern carriers 11, 18, they are rotated against one another about the rotational axis R in the overloaded operational state. In this manner, holes 110, 180 that were still in congruence in the normal operational state are positioned out of congruence with one another.

The device determines the current operational state of the aircraft turbine 2 by means of the receivers 10 and the transmitting units 14.

In the present case, the receivers 10 comprise respectively one optical sensor 101, for example in the form of respectively one photoconductive cell and/or a photo diode. For an efficient light yield, a lens 100 is respectively arranged upstream of each of the sensors 101, for example in the form of respectively one converging lens.

The transmitting units 14 respectively comprise a light source 140, for example in the form of a light-emitting diode and/or a laser diode. The light sources 140 emit light rays L as information carriers, which can be detected by the receivers 10. Each of the transmitting units 14 and a respectively associated receiver 10 are aligned with respect to one another. Light rays are not disturbed by external electromagnetic signals and are therefore particularly suitable as information carriers.

The receivers 10 and the transmitting units 14 are arranged so as to be mounted rigidly with respect to one another, for example by being attached at the engine statics and/or a common carrier.

The two pattern carriers 11, 18 are arranged between the respectively associated transmitting units 14 and receivers 10. The transmitting units 14 and receivers 10 are arranged in a plane extending perpendicular to the rotational axis R, in the present case at the circumference of an area of a circle extending perpendicular to the rotational axis R. According to FIG. 2A, 2B, the transmitting units 14 and the receivers 10 respectively have an offset of approximately an eighth of a circle with respect to each other. Alternatively, also a different offset can be provided, for example by a quarter of a circle or a semi-circle.

The light rays L that are emitted by the transmitting units 14 towards the associated receivers 10 extend substantially perpendicular to the rotational axis R. The light rays L of the transmitting units 14 intersect the rotational axis R at a common point.

The holes 110, 180 of the two pattern carriers 11, 18 are substantially located in the same plane perpendicular to the rotational axis R as the transmitting units 14 and the receivers 10. If the holes 110, 180 of the two pattern carriers 11, 18 are positioned in congruence with one another, the light rays L emitted by the transmitting units 14 can pass through the holes 110, 180 if the respectively facing pairs of congruent holes 110, 180 are arranged between the transmitting units 14 and the receivers 10. Otherwise, the low-pressure shaft 20 covers the light rays L. Thus, a rotation of the low-pressure shaft 20 leads to a periodic signal in each of the receivers 10 with a frequency that depends on the rotational speed. In the present case, each receiver 10 receives a signal from the respectively associated transmitting unit 14 eight times per revolution of the low-pressure shaft 20. The signal of a receiver 10 can for example be a square-wave signal. Depending on the shape and size of the holes 110, 180, the signal can also be substantially sinusoidal.

In the overloaded operational state, the holes 110, 180 are positioned out of congruence with one another (FIG. 2B). In this way, the light rays L of the transmitting units 14 cannot reach the receivers 10. The light rays L are respectively blocked at least mostly by either the first or the second pattern carrier 11, 18. The receivers 10 receive an at least mostly weakened or no signal.

If the low-pressure shaft 20 breaks, meaning that a shaft break occurs, the turbine 26 will accelerate and the compressor 24 will brake. In this manner, a relative movement between the pattern carriers 11, 18 occurs. Thus, the holes 110, 180 (or, generally speaking, the pattern sites) of the pattern carriers 11, 18 are positioned out of congruence with one another. This can be detected by means of the device 1. As a result of a further relative movement between the pattern carriers, the holes 110, 180 can again be positioned in congruence with one another. The device 1 can detect the shaft break before it occurs.

Thus, the first pattern carrier 11 serves as a reference for the second pattern carrier 18. The first pattern carrier 11 is thus embodied as a reference tube.

Via suitable electrical signal lines 16, the transmitting units 14 and the receivers 10 are respectively in operative connection with an analysis unit 12 of the device 1. The analysis unit 12 controls the transmitting units 14. The receivers 10 send their signals to the analysis unit 12. The analysis unit 12 can for example be embodied in the form of a microprocessor or a computer. In particular, the analysis unit 12 is an electronic engine control (EEC) or an engine monitoring unit (EMU) of the aircraft gas turbine 2.

If the analysis unit 12 receives only a mostly weakened or no signal from at least one of the receivers 10 over a predefined period of time, it determines that an aircraft turbine 2 is in the overloaded state. Alternatively, the analysis unit 12 can detect that the aircraft turbine 2 is in the overloaded state if it receives only a mostly weakened or no signal from at least two of the receivers 10. The detection of an overloaded state can be carried out within the range of milliseconds.

If the analysis unit 12 detects an overloaded state, it can take suitable measures, for example reduce or stop a fuel supply to the combustion chamber 25 and/or output a warning signal to the user.

Based on the signal frequency of the receivers 10, the analysis unit 12 determines the rotational speed of the low-pressure shaft 20. The analysis unit 12 is in operative connection with a display unit 13 for displaying the determined rotational speed and the operational state.

If multiple receivers 10 and transmitting units 14 are used, the device 1 does not necessarily fail in the event of a failure of one or two of the receivers 10 and/or transmitting units 14.

Figure 3:
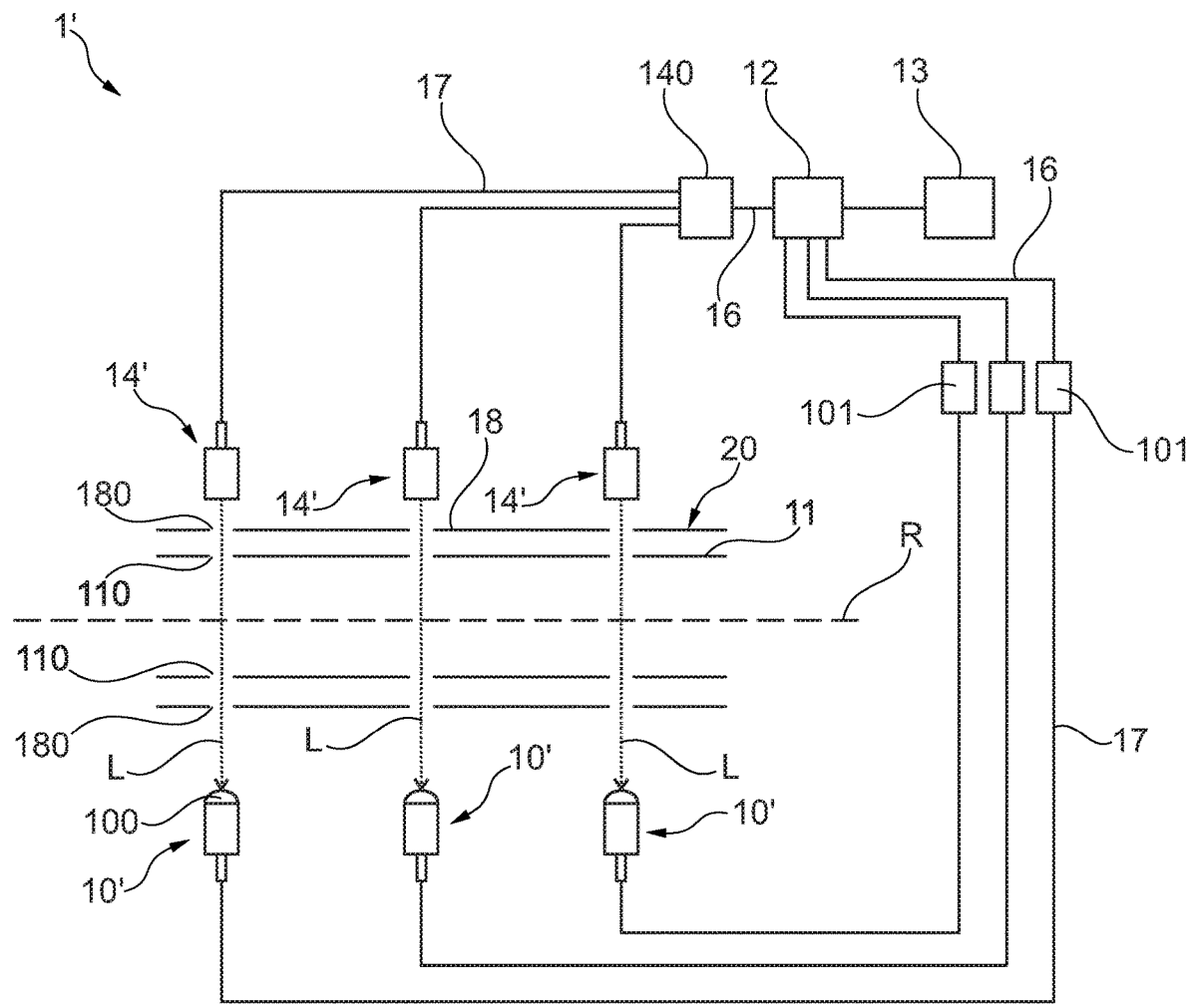
FIG. 3 shows, in a cross-sectional view along the rotational axis, a schematic rendering of a device for measuring a rotational movement of a structural component that is rotatable about a rotational axis.

FIG. 3 shows a further device 1' for measuring the rotational movement of the rotatable structural component. As with the device 1 according to FIGS. 2A and 2B, the transmitting units 14 and receivers 10 are arranged in a plane that intersects with the rotational axis R. In contrast to that, the plane extends with an axis extending along the rotational axis R.

The (in the present case tree) transmitting units 14 are substantially aligned in parallel to one another. The light rays L that are respectively emitted towards the receivers 10 extend substantially in parallel to one another (at least partially). The light rays L emitted by the transmitting units 14 towards the receivers 10 extend substantially perpendicular to the rotational axis R and intersect the rotational axis R (in the present case at points of the rotational axis R that are located at a distance from one another).

The pattern sites in the form of holes 110, 180 of the pattern carriers 11, 18 are arranged in such a manner that respectively facing pairs of congruent holes 110, 180 are positioned between the transmitting units 14 and the respectively associated receivers 10 at least two times per revolution of the low-pressure shaft 20.

A difference to the device 1 according to FIGS. 2A and 2B is that, according to FIG. 3, no optical sensors are arranged directly at the receivers 10'. Instead, the receivers 10' collect the light rays L that are falling in (via the lens 100), and guide them into respectively one optical waveguide 17, for example an optical fiber cable. The optical waveguides 17 are respectively connected to one optical sensor 101. The optical sensors 101 are arranged at a distance from the receivers 10. For example, the optical sensors 101 are arranged adjacent to the analysis unit 12 and/or in an area of the aircraft gas turbine 2 where a lower temperature is present as compared to the area of the receivers 10, and/or in an area that is not impinged by oil mist of the aircraft turbine 2.

Alternatively, only one optical sensor 101 is provided for all receivers, which can in particular be provided in not safety-critical applications. Allocation of the signals of the individual receivers can be realized by means of coding, for example by color coding (for example based on differently colored components of the individual transmitting units 14, receivers 10, and/or optical waveguides 17).

The transmitting units 14' according to FIG. 3 are embodied as radiating units that are respectively connected via an optical waveguide 17 to light sources 140 that are arranged a at a distance from one another. Possible arrangements of the light source 140 correspond to the possible arrangements of the optical sensors 101. For example, the light source 140 is arranged adjacent to at least one optical sensor 101. Alternatively, each transmitting unit 14' is connected to a separate light source via the respective optical waveguide 17.

As for the other functions of the device 1' according to FIG. 3, the above description given in connection with FIG. 2A, 2B is referred to.

Figure 9:
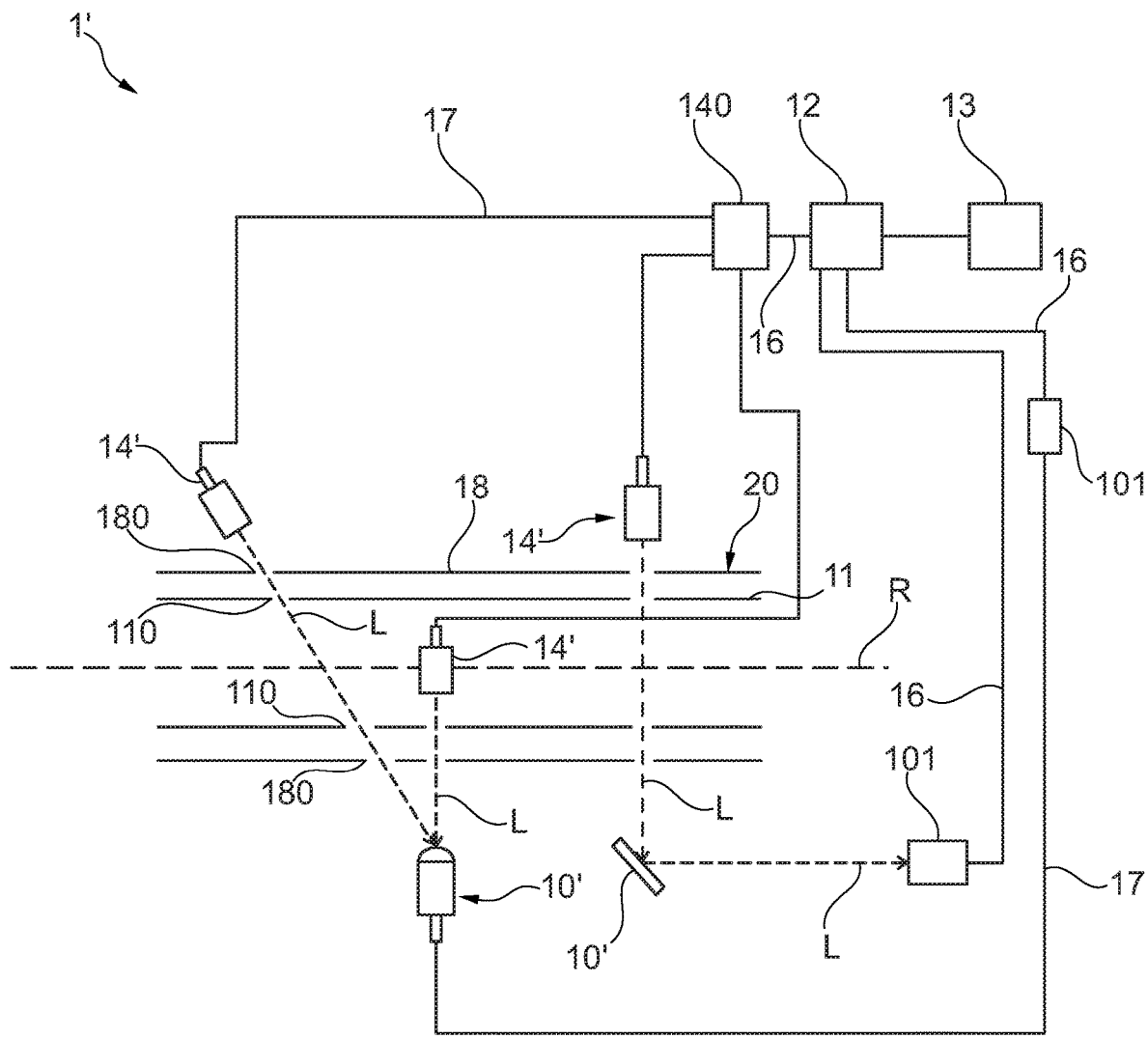
FIG. 9 shows, in the cross-sectional view along the rotational axis, a schematic rendering of a device for measuring a rotational movement of a structural component that is rotatable about a rotational axis.

Alternatively or additionally to the arrangements of the transmitting units 14, 14' and the receivers 10, 10' according to FIGS. 2A-2B and 3, it is also possible to arrange one or multiple transmitting units 14, 14' and/or receivers 10, 10' inside the pattern carrier 11, 18, as shown in FIG. 9.

FIG. 9 further shows that two transmitting units 14' are aligned towards one common optical sensor 10'. The light rays L emitted by the transmitting units 14' extend obliquely to one another. For example, the light rays L have different colors. The holes 110, 180 are arranged along the light rays L of the transmitting units 14'.

FIG. 9 further shows that a receiver 10' can also be embodied as a mirror. The receiver 10' embodied as a mirror (the right-hand receiver 10' in FIG. 9) guides the light rays L of the associated transmitting unit 14' to an optical sensor 101 that is arranged at a distance. In this manner, an optical waveguide can be foregone.

Figure 4:
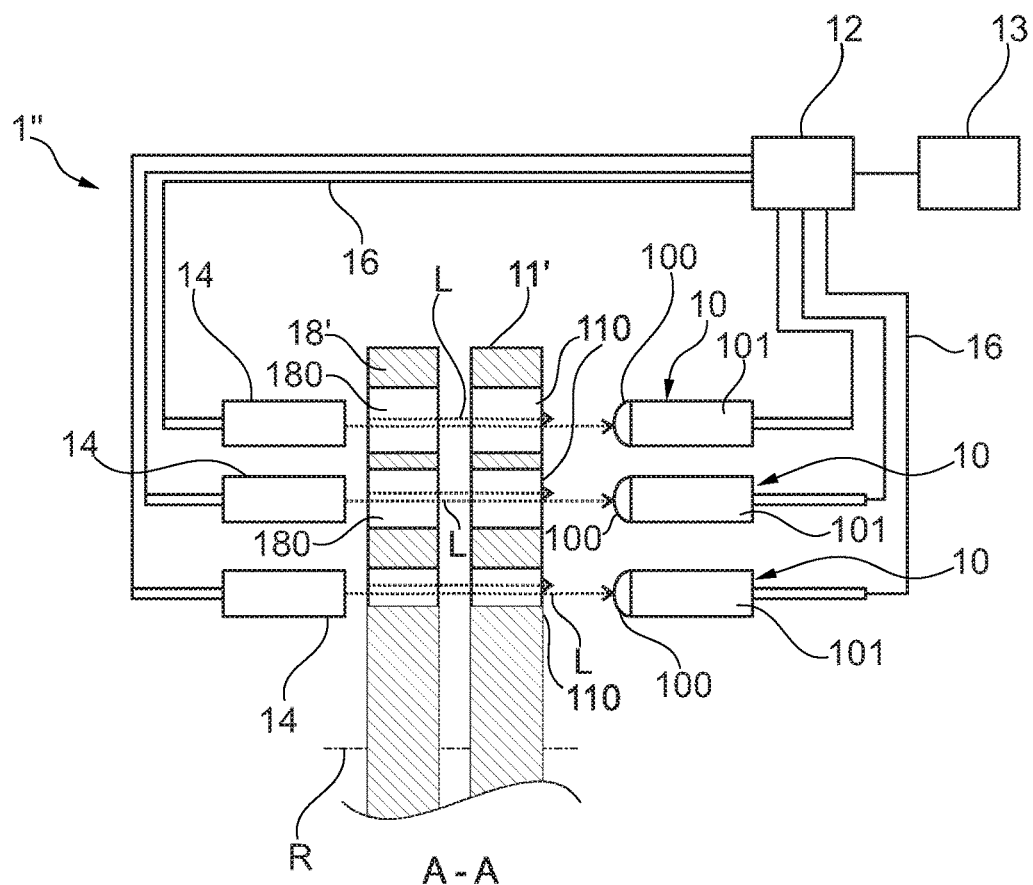
FIG. 4 shows, in a cross-sectional view along the rotational axis, a schematic rendering of a device for measuring a rotational movement of a structural component that is rotatable about a rotational axis.
Figure 6:
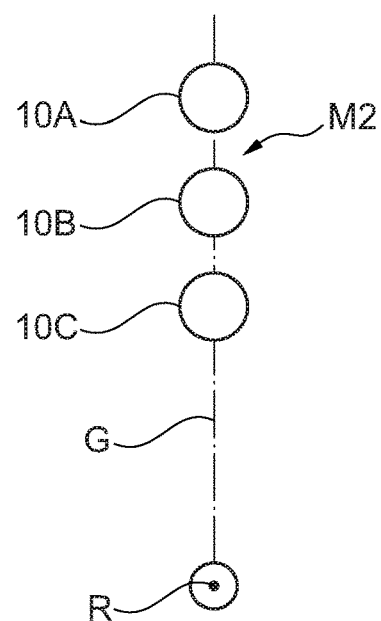
FIG. 6 shows, in a top view along the rotational axis, a schematic rendering of an arrangement of multiple receivers of the device according to FIGS. 4-5.
Figure 5:
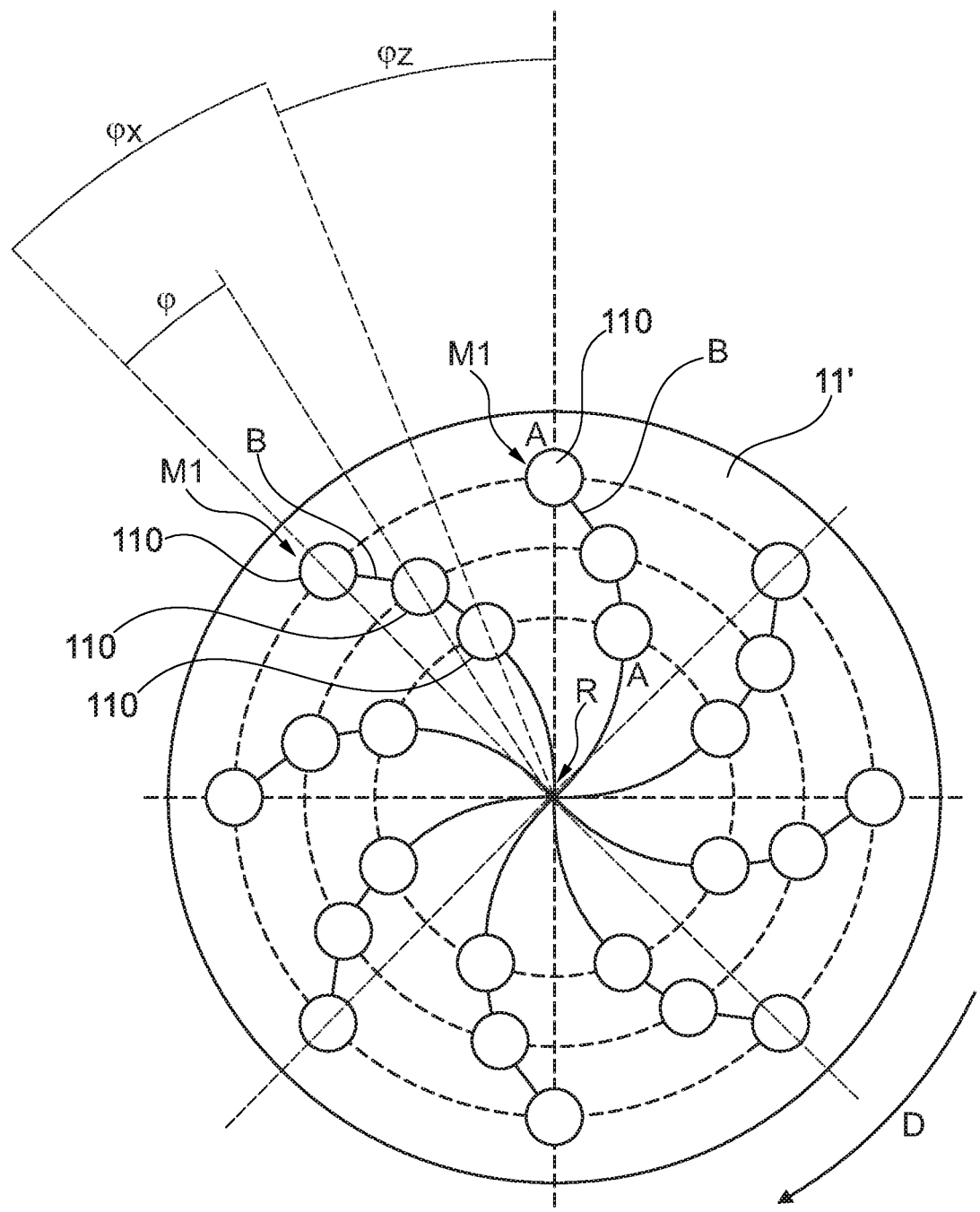
FIG. 5 shows, in a top view along the rotational axis, a schematic rendering of a pattern carrier of the device according to FIG. 4 that is embodied in the form of a punched disk.

FIGS. 4-6 show a device 1" with pattern carriers 11', 18' that are respectively embodied in the form of a circular punched disk. The device 1" comprises three receivers 10 and three transmitting units 14 respectively dedicated to one of the receivers 10.

The pattern carriers 11', 18' are arranged adjacent and in parallel to one another. The pattern carriers 11', 18' are arranged concentrically with respect to the rotational axis R.

The second pattern carrier 18' is attached to the low-pressure shaft 20 at the drive end 203 of the low-pressure shaft 20. The first pattern carrier 11' is attached to the low-pressure shaft 20 at the output end 204 of the low-pressure shaft 20.

The receivers 10 and transmitting units 14 correspond to the receivers 10 and transmitting units 14, which have been described in connection with the device 1 according to FIGS. 2A and 2B.

The transmitting units 14 are aligned substantially in parallel to one another. The light rays L that are respectively emitted towards the receivers 10 substantially extend (at least partially) in parallel to one another. The light rays L emitted by the transmitting units 14 towards the receivers 10 extend substantially in parallel to the rotational axis R.

The pattern carriers 11', 18' are arranged between the transmitting units 14 and the receivers 10. The pattern carriers 11', 18' are rotatable about the rotational axis R.

As is in particular illustrated in FIG. 5, multiple pattern sites in the form of continuous holes 110 are provided in the first pattern carrier 11'. The holes 110 extend substantially in parallel to the light rays L emitted by the transmitting units 14 through the punched disk 11 towards the receivers 10. Each of the holes 110 is allocated to exactly one of the receivers 10. The holes 110 are embodied in a circular manner and respectively have substantially the same size.

The second pattern carrier 18' has substantially the same arrangement of pattern sites in the form of holes 180 as the first pattern carrier 11'. In the normal operational state of the rotatable structural component, these holes 110 of the first pattern carrier 11' are positioned in congruence with the holes 180 of the second pattern carrier 18'.

If a pair of congruent holes 110, 180 is arranged between the associated transmitting unit 14 and the associated receiver 10 (as a result of a corresponding position due to the rotation of the pattern carriers 11', 18'), the light rays L emitted by the transmitting unit can pass the holes 110, 180. The transmitting unit 14, the holes 110, 180 and the receiver 10 are then substantially arranged on a straight line extending in parallel to the rotational axis R. On that side of the pattern carriers 11', 18' that is located opposite the transmitting unit 14, the light rays L exit from the holes 110, 180 and are detected by the receiver 10.

If no pair of congruent holes 110, 180 is arranged between the associated transmitting unit 14 and the associated receiver 10, the light rays L of the transmitting unit 14 cannot pass the pattern carriers 11', 18'. In that case, the associated receiver 10 does not detect the light rays L.

Respectively three holes 110, 180 of the pattern carriers 11', 18' are arranged according to a first pattern M1 with respect to one another. The first pattern M1 describes a curved line B. Thus, respectively three holes 110, 180 are arranged along the curved line B. The curved line B intersects the rotational axis R. In the present case, the curved line B is embodied in the form of a circular arc, by way of example.

The first pattern M1 is repeated multiple times along an azimuth extending circumferentially about the rotational axis R in perpendicular to the rotational axis R, in the present case eight times. A plurality of holes 110, 180 (in the present case respectively eight) is respectively arranged in a circular manner at multiple different radiuses (in the present case three) with respect to the rotational axis R. The circles of holes 110, 180 are arranged along the azimuth in a manner offset with respect to one another.

Respectively two holes 110, 180 that belong to a common first pattern M1 (meaning that they are arranged on a common curved line B at a distance from one another) are arranged along the azimuth about an azimuth angle φ in a manner offset with respect to one another. For example, an offset along the azimuth between two adjacent holes 110, 180 belonging to the same first pattern M1 can correspond to approximately up to a tenth of a diameter, or up to a tenth of a diameter or a whole diameter of those holes 110, in particular less than half a diameter, or approximately a quarter to a half of a diameter of those holes 110, 180.

It can be provided that all holes 110 belonging to a common first pattern M1 are arranged so as to be respectively offset with respect to one another by the same azimuth angle φ. Alternatively, the azimuth angles φ can be different. For example, the azimuth angle φ between the radially outer hole 110 and the radially central hole 110 is larger or smaller than the azimuth angle between the radially central hole and the radially inner hole 110.

As shown in FIG. 5, in total the holes 110 of a first pattern M1 span one azimuth angle $\varphi_x$ (wherein in the present case the azimuth angle refers to the center points of the holes 110). This angle $\varphi_x$ can also be referred to as the pattern width $\varphi_x$. The pattern width $\varphi_x$ is larger than the azimuth angle φ around which two holes 110 are arranged adjacent to each other along the azimuth (or, generally speaking, two pattern sites are arranged adjacent to each other along the azimuth) in a manner offset with respect to one another: $\varphi_x > \varphi$.

Two adjacent first patterns M1 can be arranged along the azimuth so as to be offset with respect to one another by an azimuth angle $\varphi_z$ (as shown in FIG. 5). The azimuth angle $\varphi_z$ can also be referred to as the pattern distance $\varphi_z$. The pattern distance $\varphi_z$ is larger than the pattern width $\varphi_x$: $\varphi_z > \varphi_x$.

FIG. 4 shows a view according to a section A-A along a curved line B that is indicated in FIG. 5. If the punched disk 11 is aligned respectively, light rays L of each of the transmitting units 14 can pass an associated hole 110 and be detected by an associated receiver 10.

As illustrated in FIG. 6, the in the present case three receivers 10 of the device 1'' are arranged according to a second pattern M2. The second pattern M2 differs from the first pattern M1. In the present case, the second pattern M1 describes a straight line G. The straight line G intersects with the rotational axis R.

The receivers 10 (in the present case tree) that are arranged according to the second pattern M2 are arranged substantially at the same radial distances to the rotational axis R as the pattern sites that belong to a common first pattern M1 and in the present case are embodied in the form of holes 110, 180.

As a result of a rotation of the pattern carriers 11', 18' about the rotational axis R, the congruent holes 110, 180 can be successively positioned in congruence with the associated transmitting unit 14 and the associated receiver 10. If the holes 110, 180 are positioned in congruence or on a straight line with respect to the associated transmitting unit 14 and the associated receiver 10, the light rays L emitted by the transmitting unit 14 can exit through the holes 110, 180 on that side of the holes 110, 180 that is facing towards the receiver 10. The receiver 10 can detect the light rays L exiting from the associated holes 110, 180.

Apart from the holes 110, the pattern carriers 11', 18' are not passable to light (or, generally speaking, substantially unpassable for the information carrier). If none of the holes 110, 180 are at least partially in congruence with the receiver 10, the receiver 10 cannot detect the light rays L emitted by the associated transmitting unit 14.

A rotation of the pattern carriers 11', 18' about the rotational axis R with respect to the transmitting units 14 and the receivers 10 puts the holes 110, 180 of a common first pattern M1 in congruence with their respectively associated transmitting units 14 and receivers 10 at staggered time intervals. The receivers 10 send signals S1-S3 to the analysis unit 12.

Figure 7:
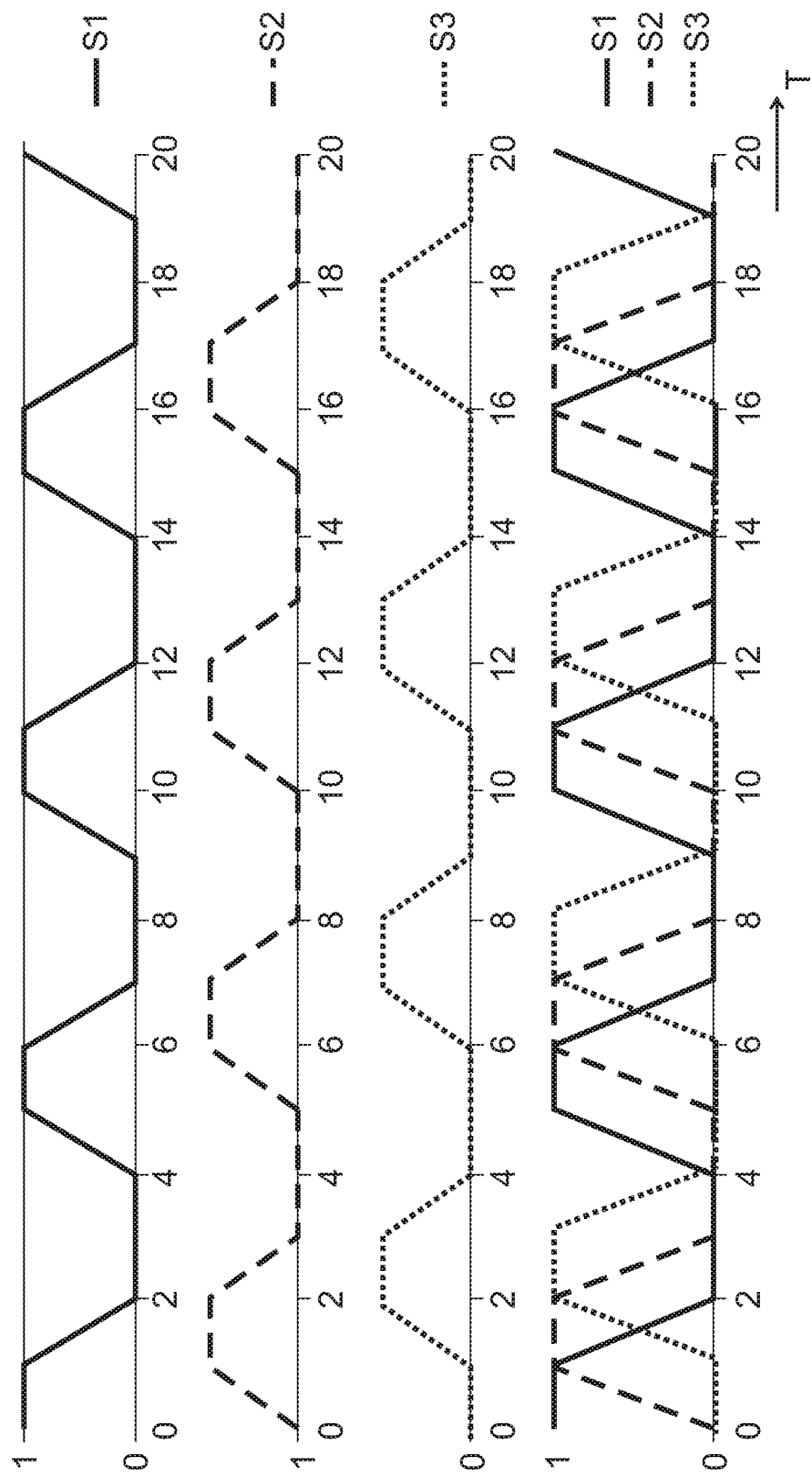
FIG. 7 shows a schematic rendering of exemplary measuring values of the receiver of the device according to FIGS. 4-6.

FIG. 7 schematically shows the temporal development of the signals S1-S3 of the three receivers 10 shown in FIGS. 4 and 6 during a rotation of the shaft. In the normal operational state, the receivers 10 send signals S1-S3 to the analysis unit 12 around the rotational axis R along a rotational (clockwise) direction D shown in FIG. 5. Here, the time T is indicated on the x-axis, with the y-axis respectively showing the signal strength of the signals S1-S3.

A first signal S1 comes from the radially inner receiver 10. A second signal S2 comes from the radially central receiver 10. A third signal S3 comes from the radially outer receiver 10.

As soon as congruent holes 110, 180 are positioned between the associated pair of transmitting unit 14 and receiver 10 as a result of the rotation of the pattern carriers 11', 18', the receiver 10 begins receiving light rays L of the transmitting unit 14, and sends a signal S1-S3 that differs from zero. The signal S1-S3 increases along a rising edge, until the holes 110, 180 are positioned in the greatest possible congruence with the receiver 10. In the shown example, the light rays L are bundled more tightly than the diameter of the holes 110, 180, so that the signal S1-S3 remains approximately constantly on a maximum value over a period of time. As soon as the congruence of the holes 110, 180 with the receiver 10 decreases again due to a further rotation of the pattern carriers 11', 18', the signal S1-S3 decreases down to zero. As soon as the next congruent holes 110, 180 arrive at the receiver 10, a new period of the signal curve begins. The number of periods per time unit determines the frequency of the signals S1-S3. In the bottom area of FIG. 7, the signals S1-S3 of the three receivers 10 are shown in a superimposed manner. The rotation of the pattern carriers 11', 18' along the rotational direction D at first leads to the increase of the first signal S1, then of the second signal S2, and then of the third signal S3.

Since the holes 110 according to FIG. 5 partially overlap along the azimuth, the signals S1-S3 of adjacent holes 110 can be different from zero at the same point in time. For example, scattered light from an edge of a hole 110 can also contribute to that.

As becomes clear based on FIG. 7, the adjacent first pattern M1 has such a pattern distance $\varphi_z$ that the signals S1-S3 of all receivers 10 substantially fall to zero between the first patters M1. A signal pause of the signals S1-S3 of all receivers 10 between two adjacent first patterns M1 is created. In the signal pause, none of the signals S1-S3 of the receivers 10 takes on its maximum value. The signal pause is longer than the distance between the transition from the maximum value to the falling edge of the first signal S1, and the transition from the rising edge to the maximum value of the third signal S3.

In the event that the middle receiver 10 fails, the rotational direction can still be determined based on only the signals S1 and S3 of the radially inner and the radially outer receivers 10 due to the provided signal pause. The receivers 10 can be arranged in any desired manner about the rotational axis R, as long as it is ensured that a differentiation of the receivers 10 based on the time signal S1-S3 is possible.

The analysis unit 12 analyzes the signals S1-S3 received by the receivers 10. Based on the frequency of the signals S1-S3, the analysis unit 12 determines the rotational speed of the pattern carriers 11', 18' and thus of the low-pressure shaft 20 (generally speaking, of the rotatable structural component connected therewith). Optionally, the analysis unit 12 respectively determines the frequency of the individual signals S1-S3 and calculates the mean value of the frequencies. Mean value formation can increase the measuring accuracy.

Based on the order of the periods of the individual signals S1-S3, the analysis unit 12 determines the rotational direction of the pattern carriers 11', 18' and thus of the low-pressure shaft 20 (generally speaking, of the rotatable structural component connected therewith). Should the signal strength of the third signal S3 be increased before the signal strength of the second and of the first signal S2, S1, the analysis unit 12 would determine that the punched disk 11 rotates counter to the rotational direction D (counterclockwise).

In the overloaded operational state, the holes 110, 180 are positioned out of congruence with one another, as in the devices 1, 1" according to FIGS. 2-3. Thus, the light rays L are at least mostly blocked either by the first or the second pattern carrier 11', 18', respectively. The receivers 10 receive an at least mostly weakened or no signal.

Exemplary possibilities for an arrangement of the pattern carriers 11', 18' at the low-pressure shaft 20 or at the high-pressure shaft 21 comprise the arrangement at an axial end of the shaft 20, 21 as well as inside the shaft 20, 21.

Figure 8:
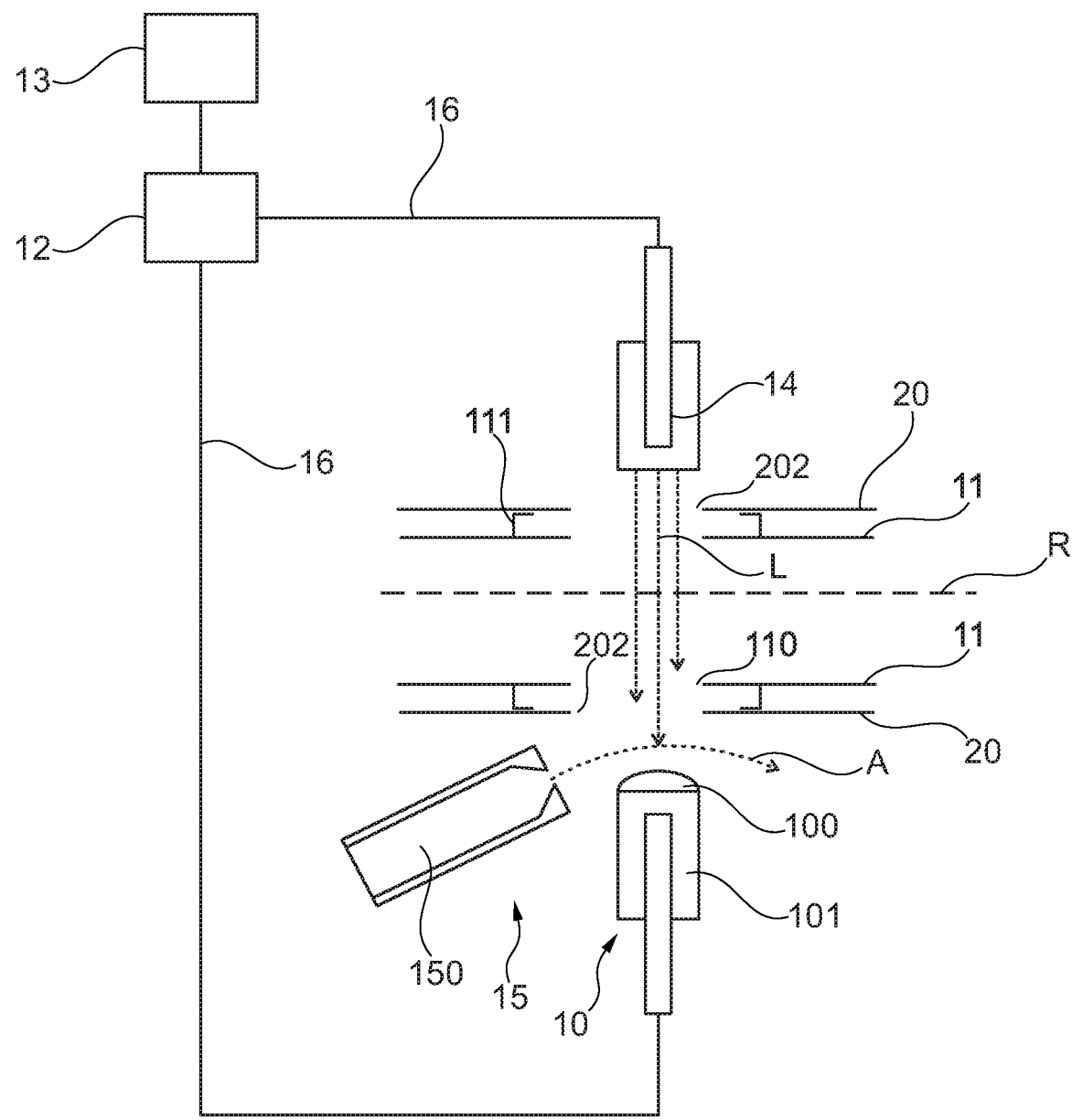
FIG. 8 shows a schematic rendering of an anti-fogging device of the devices according to FIGS. 2-7

FIG. 8 shows an anti-fogging device 15 of the device 1, 1', 1" with an air nozzle 150, which is not shown in FIGS. 1-7. The air nozzle 150 is arranged adjacent to one or multiple of the receivers 10.

The air nozzle 150 blows an air flow A via the receiver(s) 10, more specifically via the lens 100 of the receiver(s) 10. The air flow A prevents floating particles of the gas surrounding the receiver 10 from depositing at the lens 100, in particular an oil mist of the aircraft turbine 2. Further, the air flow A avoids any condensation of components of the gas surrounding the receiver 10 at the lens 100. Thus, the air nozzle 150 at least mostly avoids fogging of the lens 100, so that the function of the receiver 10 is substantially not compromised by fogging.

Optionally, air baffles and/or flow channels can be provided in the area of the air flow A. In this manner, any influence by carried-along oil mist (as in the type of a jet pump) can be avoided or at least minimized.

Optionally, the air nozzle 150 can be adjusted (for example with respect to the blow direction of the air flow A and/or the strength of the air flow A), and for this purpose can be in operative connection with the analysis unit 12 and be controlled by the analysis unit 12, for example. A common air nozzle 150 for all receivers 10 can be provided. Alternatively, respectively one air nozzle 150 is provided for each of the receivers 10. Likewise, one or multiple air nozzles 150 can be provided for a transmitting unit 14 or multiple transmitting units 14.

Bleed air can serve as the air for the air flow A, for example. The air for the air flow A is for example extracted from a compressor stage 240, 241 and supplied to the air nozzle 150. In particular, the air for the air flow A is provided with an overpressure.

Between the first and the second pattern carrier 11, 18, (in particular circumferential) stiffeners 111 are provided, by means of which the second pattern carrier 18 is stiffened. Thanks to the stiffeners 111, a particularly thin material can be used for the second pattern carrier. In addition, the stiffeners 111 limit radial movements of the low-pressure shaft following a shaft break. Thus, the danger of bearing sites being deflected can be reduced.

Based on the above-mentioned exemplary embodiments, the aircraft turbine 2 has been described by way of example based on a device 1, 1', 1". However, the aircraft turbine 2 can also comprise more than one device 1, 1', 1", in particular one device 1, 1', 1" per shaft 20, 21 and/or one device 1, 1', 1" at every bearing 200, 201, 210, 211.

In the device according to FIGS. 2A and 2B, the transmitting units 14 and receivers 10 are arranged along the azimuth about the rotational axis R in a manner offset with respect to one another. In the device according to FIG. 3, the transmitting units 14' and receivers 10' are arranged along the rotational axis R in a manner offset with respect to one another. Of course, also a combination is possible in such a manner that the transmitting units 14, 14' and/or receivers 10, 10' are arranged along the azimuth about the rotational axis R as well as along the rotational axis R in a manner offset with respect to one another.

PARTS LIST

1, 1', 1" device
10, 10' receiver
100 lens
101 optical sensor
11, 11' first pattern carrier
110 hole (pattern site)
111 stiffener
12 analysis unit
13 display unit
14, 14' transmitting unit
140 light source
15 anti-fogging device
150 air nozzle
16 electrical signal line
17 optical waveguide
18, 18' second pattern carrier
180 hole (pattern site)
2 aircraft gas turbine
20 shaft (low-pressure shaft)
200, 201 bearing
203 drive end
204 output end
21 shaft (high-pressure shaft)
210, 211 bearing
213 drive end
214 output end
22 housing
23 air intake
24 compressor
240 low-pressure compressor
241 high-pressure compressor
25 combustion chamber
26 turbine
260 low-pressure turbine
261 high-pressure turbine
27 nozzle
A air flow
B curved line
D rotational direction
φ azimuth angle
G straight line
L light rays
M1 first pattern
M2 second pattern
R rotational axis
S1-S3 signal
T time

The invention claimed is:
1. A turbomachine comprising:
a rotatable shaft;
a device for measuring a rotational movement of the rotatable shaft, wherein the device comprises:
a receiver and a first pattern carrier that includes a first pattern site,
a second pattern carrier that includes a second pattern site,
wherein the first and second pattern carriers are respectively connectable or connected to the rotatable shaft, so that they are rotatable together about a rotational axis with respect to the receiver such that the first pattern site is positioned in congruence with the second pattern site, and
wherein the receiver is embodied and configured for detecting whether or not the first and second pattern sites are positioned in congruence with one another,
wherein the first pattern carrier is arranged radially inside the second pattern carrier, wherein the second pattern carrier forms a part of the rotatable shaft.

2. The turbomachine according to claim 1, wherein one of the first and second pattern carriers is connectable or connected to the rotatable shaft at an input end of the rotatable shaft, and the other one of the first and second pattern carriers is connectable or connected to the rotatable shaft at an output end of the rotatable shaft.

3. The turbomachine according to claim 1, wherein the first and second pattern carriers are connectable or connected to the rotatable shaft in such a manner that the first and second pattern sites are positioned in congruence with one another if the rotatable shaft is in a normal operational state, and are positioned out of congruence with one another if the rotatable shaft is in an overloaded operational state.

4. The turbomachine according to claim 1, wherein the first and second pattern sites extend parallel to the rotational axis through the first and second pattern carriers.

5. The turbomachine according to claim 1, wherein an information carrier can reach the receiver from the first and second pattern sites or through the first and second pattern sites if the first and second pattern sites are positioned in congruence with one another.

6. The turbomachine according to claim 5, wherein the receiver is embodied and configured to detect the information carrier, wherein the information carrier embodied as at least one chosen from a radiation, a mass flow a sound, light rays, air flow and an ultrasound.

7. The turbomachine according to claim 5, and further comprising at least one sensor for detecting the information carrier, the at least one sensor being at least one chosen from an optical sensor, a mass flow meter, a pressure gauge, and a microphone.

8. The turbomachine according to claim 5, and further comprising at least one transmitting unit that is embodied and configured to emit the information carrier, and that comprises at least one chosen from a light source, an air nozzle and an acoustic source, wherein the first and second pattern carriers are arranged between the at least one transmitting unit and the receiver.

9. The turbomachine according to claim 1, wherein the first and second pattern carriers respectively have at least two pattern sites, and further comprising at least two receivers.

10. The turbomachine according to claim 9, wherein the at least two pattern sites of each of the first and second pattern carriers or the at least two receivers are arranged in a manner offset with respect to one another along an angle that extends circumferentially about the rotational axis, or are offset in a different manner with respect to one another along the angle.

11. The turbomachine according to claim 9, wherein at least one chosen from the at least two receivers and the at least two pattern sites of each of the first and second pattern carriers are respectively arranged in a manner offset with respect to one another in a direction perpendicular to the rotational axis.

12. The turbomachine according to claim 9, wherein the at least two pattern sites of each of the first and second pattern carriers are arranged according to a first pattern, and the at least two receivers are arranged according to a second pattern, wherein the first pattern differs from the second pattern.

13. The turbomachine according to claim 9, wherein at least one chosen from the at least two receivers and the at least two pattern sites of each of the first and second pattern carriers are respectively arranged in a manner offset with respect to one another in a direction parallel to the rotational axis.

14. The turbomachine according to claim 1, and further comprising at least one anti-fogging device that directs a fluid flow onto at least one chosen from the receiver and a transmitting unit in order to avoid condensation on the receiver due to the surrounding gas.

15. The turbomachine according to claim 1, wherein the turbomachine is embodied as an aircraft gas turbine.

16. The turbomachine according to claim 1, wherein the first and second pattern sites extend perpendicular to the rotational axis through the first and second pattern carriers.

17. A method for measuring a rotational movement of a rotatable shaft of a turbomachine comprising:

providing a receiver and a first pattern carrier that includes a first pattern site, providing a second pattern carrier that includes a second pattern site, providing that the first and second pattern carriers are respectively connected to the rotatable shaft, so that they are rotatable together about a rotational axis with respect to the receiver such that the first pattern site is positioned in congruence with the second pattern site, and wherein the receiver detects whether or not the first and second pattern sites are positioned in congruence with one another, providing that the first pattern carrier is arranged radially inside the second pattern carrier, and that the second pattern carrier forms a part of the rotatable shaft.

18. The method according to claim 17, wherein, based on the information detected by the receiver, at least one chosen from an overloaded operational state and a shaft break of the rotatable shaft is detected, and a control signal is output to an engine control if the at least one chosen from the overloaded operational state and the shaft break is detected.

* * * * *